United States Patent [19]

Prunty et al.

[11] Patent Number: 5,786,281
[45] Date of Patent: Jul. 28, 1998

[54] EROSION CONTROL BLANKET AND METHOD OF MANUFACTURE

[75] Inventors: Timothy Prunty, Rice Lake, Wis.; Wendell E. Johnson, deceased, late of Dallas; John W. Johnson, legal representative, Colleyville, both of Tex.

[73] Assignee: American Excelsior Company, Arlington, Tex.

[21] Appl. No.: 792,978

[22] Filed: Feb. 3, 1997

Related U.S. Application Data

[62] Division of Ser. No. 402,166, Mar. 10, 1995, Pat. No. 5,735,982.

[51] Int. Cl.$^6$ .................................. B32B 5/02; E02B 3/12
[52] U.S. Cl. .............................. 442/104; 405/15; 405/19; 428/192; 442/327
[58] Field of Search ........................... 405/15, 16, 19; 428/198, 192; 442/59, 76, 104, 327

[56] References Cited

U.S. PATENT DOCUMENTS

| | | |
|---|---|---|
| 3,517,514 | 6/1970 | Visser . |
| 3,716,998 | 2/1973 | Lerche-Svendsen et al. . |
| 3,867,250 | 2/1975 | Jankowiak et al. . |
| 4,135,843 | 1/1979 | Umemoto et al. . |
| 4,306,929 | 12/1981 | Menikheim et al. . |
| 4,353,946 | 10/1982 | Bowers ................................. 428/255 |
| 4,476,078 | 10/1984 | Tao . |
| 4,580,960 | 4/1986 | Apman ................................. 156/62.2 |
| 4,635,576 | 1/1987 | Bowers ................................. 405/19 |
| 4,896,993 | 1/1990 | Bohnhoff . |
| 5,249,893 | 10/1993 | Romanek ............................. 405/19 |
| 5,257,878 | 11/1993 | Peterson ............................. 405/15 |
| 5,330,828 | 7/1994 | Jacobsen ............................. 428/255 |
| 5,429,450 | 7/1995 | Meidinger .......................... 405/15 |

FOREIGN PATENT DOCUMENTS 2263684  7/1974  Germany .

OTHER PUBLICATIONS

American Excelsior Company, Erosion Control Products Brochure.

*Primary Examiner*—Daniel Stemmer
*Attorney, Agent, or Firm*—Jenkens & Gilchrist, P.C.

[57] ABSTRACT

An environmentally sound vegetation growth-enhancing erosion control blanket is formed from an elongated rectangular excelsior/wood wool mat. The mat is held together with adhesive and a surface pattern is embossed therein. When the finished blanket is placed atop the ground, the blanket serves to shield the earth area from wind and water erosion forces, without the presence of the plastic netting often used in the prior art. As the ground vegetation grows, it ultimately replaces the blanket which decomposes and furnishes the ground vegetation with a nutritive mulch.

7 Claims, 3 Drawing Sheets

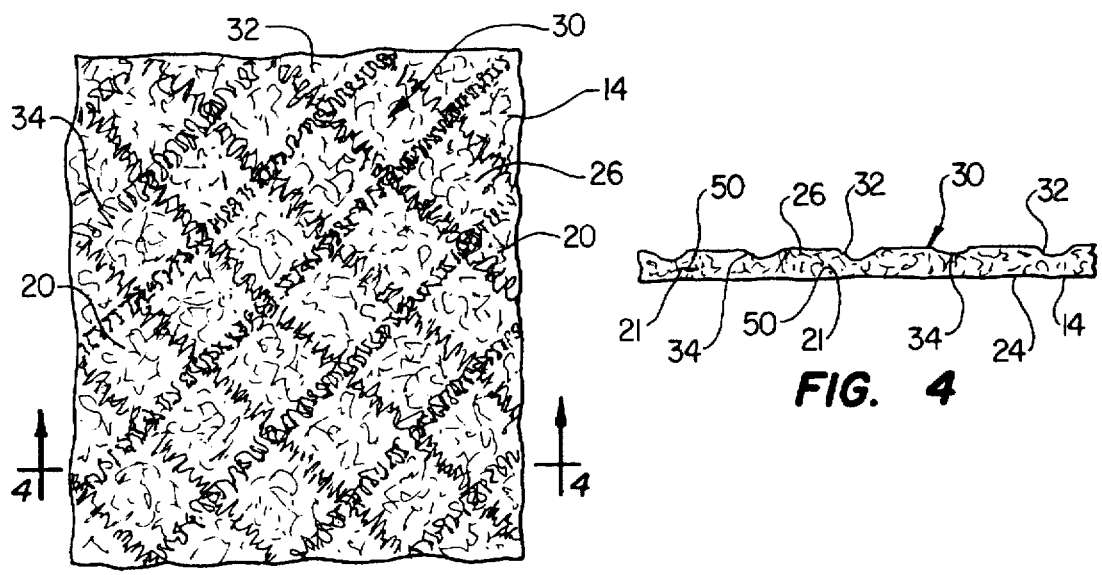
FIG. 3
FIG. 4
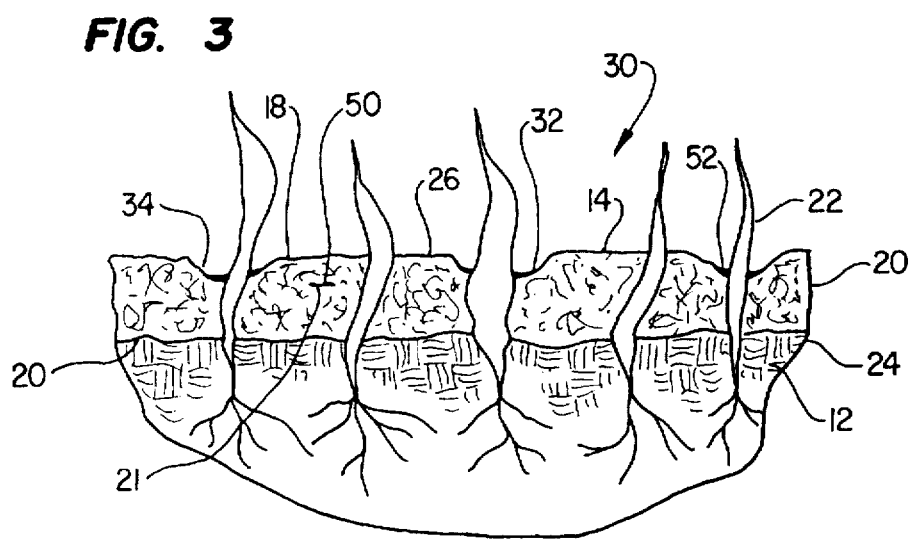
FIG. 5
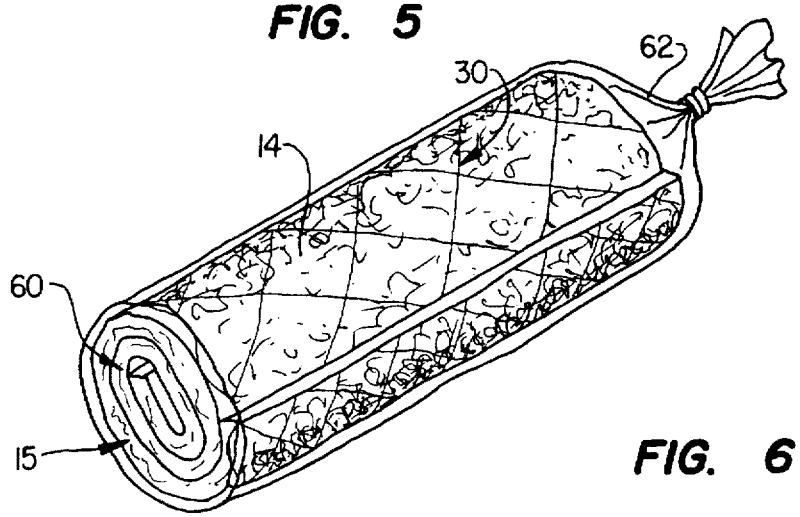
FIG. 6

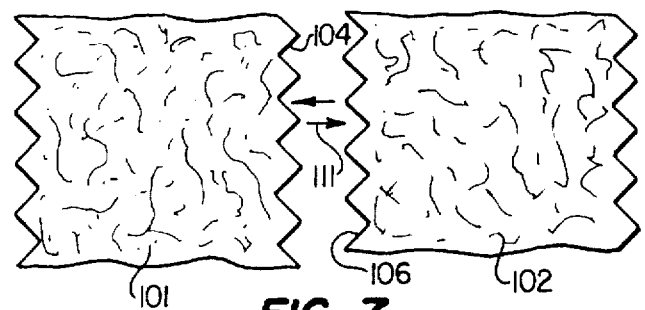
FIG. 7
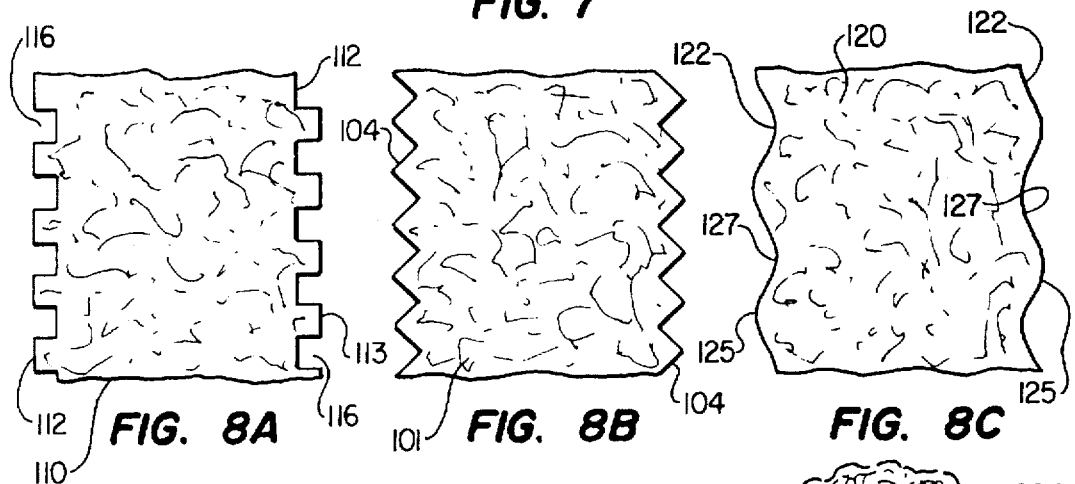
FIG. 8A  FIG. 8B  FIG. 8C
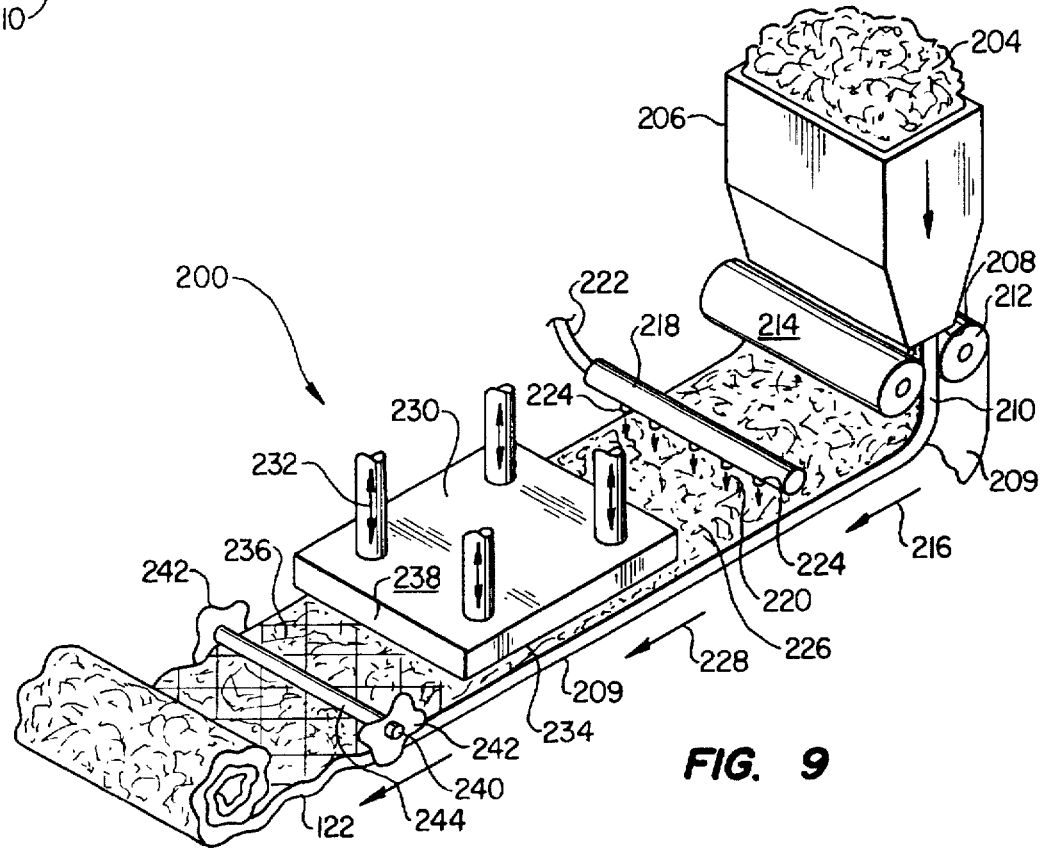
FIG. 9

EROSION CONTROL BLANKET AND METHOD OF MANUFACTURE

This is a Division of application Ser. No. 08/402,166 filed on Mar. 10, 1995, now U.S. Pat. No. 5,735,982.

BACKGROUND OF THE INVENTION

1. Field of the Invention

The present invention relates to fibrous erosion control blankets for inhibiting ground erosion in flat or sloping, often bare earth areas, or channels, where water flows, and, more particularly, to erosion control blankets adapted to permit ground vegetation to grow upwardly therethrough, without the use of various types of netting.

2. History of the Prior Art

For both aesthetic and environmental protection reasons, it is often necessary or desirable to grow ground vegetation, such as grass, on flat land or slopes, channels, and bare earth areas to inhibit erosion due to the effects of wind and rain. The successful sprouting and growth of ground vegetation planted on these areas, however, is often prevented by the soil erosion which the planted vegetation is designed to inhibit, the erosion frequently carrying away at least some portion of the soil before the vegetation takes hold.

To alleviate this problem, it is now a common practice to cover the area with fibrous, mat-like members commonly referred to as erosion control blankets. One particularly effective erosion control blanket is the "Curlex" or excelsior blanket manufactured and sold by the American Excelsior Company of Arlington, Tex. since 1964. This erosion control blanket is fabricated, in elongated rectangular mat form, from elongated, randomly intertwined fiber commonly referred to as "excelsior" or "wood wool." The fiber mats have historically been held together or contained by photodegradable netting material, which form nets on one or both sides of the fiber. The blanket-net assemblies are then conveniently packaged in individually rolled bundles to facilitate their handling and transport to the erosion control job site. The netting is generally necessary during manufacturing, shipping and the subsequent job site installation in order to maintain the integrity of the excelsior/wood wool mat.

At the job site, the blanket bundles are unrolled in a side-to-side relationship along the earth area to be protected against erosion, and are secured along the sides of one another and to the underlying ground area with the use of a spaced series of conventional ground staple members, which may be made of steel, wood, plastic or starch. The installed blankets generally have parallel sides and abut one another to form a substantially solid surface to shield the underlying earth area, and thus the planted ground vegetation therein, from wind and rain erosion forces. The abutting, parallel side surfaces do, however, often is create seams in the otherwise solid surface which can allow water to channel down areas between adjacent blankets.

The individual fibers forming the mat portions of various types of the blankets collectively define therebetween a multiplicity of small interstitial regions through which the planted ground vegetation may upwardly sprout and grow. During such shielded vegetation growth, some varieties of the blankets, such as the "Curlex" blanket decompose, ultimately being replaced by the emerging ground vegetation.

Despite the erosion control effectiveness of these excelsior/wood wool blanket-net assemblies, and similar blankets formed from other fibrous-net materials, erosion control blankets of this general type have a distinct disadvantage. The problem pertains to the use of the netting material often utilized to contain the fiber. Although the netting may be photodegradable, it may last long enough to present ecological problems. It has been reported that conventional netting is capable of trapping birds and other small wildlife attempting to nest or habitat in the erosion control blankets. Until the netting material photodegrades, it does present an ecological impediment to normal animal activity. It would be an advantage therefore to provide the usefulness of the excelsior/wood wool mat without the necessity of the netting material.

The present invention overcomes disadvantages of the prior art by providing an excelsior/wood wool mat which may be fabricated and applied to areas in need of erosion control without the use of the netting. In order to contain the loose intertwined wood fibers, a bonding system is utilized to secure these fibers and maintain the integrity of the mat formation thereof. In this manner, a separate netting is not necessary to contain the fibers either during shipping and handling or at the site of the erosion control blanket installation. Contoured sides may also be used for an interlocking configuration of adjacent mats to inhibit water channeling therebetween.

SUMMARY OF THE INVENTION

The present invention relates to erosion control blankets. More particularly, one aspect of the invention incorporates an erosion control blanket formed of an elongated flexible mat comprising a multiplicity of elongated, intertwined members that collectively define in the mat a multiplicity of interstitial regions through which, when the mat is positioned atop the area of earth to be protected, portions of the growing ground vegetation may upwardly pass. According to an important feature of the invention, at least a major portion of the intertwined members are held together with a bonding system such as a bonding agent to eliminate the need for netting. A surface configuration on one side of the mat improves the soil erosion efficiency thereof.

Accordingly, when the mat is laid upon the area to be protected, it inhibits erosion thereof and immediately provides it with erosion control without the ecological problem of the netting. Additionally, as the emerging vegetation begins to sprout upwardly through the interstitial regions of the ground-disposed mat, the emerging vegetation is advantageously exposed without the need for any photodegradation of netting material that could otherwise trap birds and the like.

In accordance with the preferred method of manufacturing the erosion control blanket, its mat portion is formed from excelsior/wood wool or the like and the mat has a designed surface on at least one side of the blanket. The mat is longitudinally passed beneath a stationary spray head operated to spray a bonding agent through the mat as it passes. The discharge volume of the bonding agent is set to effect the secured assembly thereof. The mat with the embossed surface configuration is then capable of erosion control. In another aspect, the above described invention may also include contoured side portions of the mats which permit an interlocking configuration between adjacent mats. In another aspect, the bonding system includes fusing the intertwined members together with heat, glue, mechanical means or the like.

BRIEF DESCRIPTION OF THE DRAWINGS

For a more complete understanding of the present invention and for further objects and advantages thereof, reference may now be had to the following description taken in conjunction with the accompanying drawings in which:

FIG. 3 is an enlarged top plan view of one embodiment of an erosion control blanket constructed in accordance with the principles of the present invention;

FIG. 4 is a side elevational, cross sectional view of the erosion control blanket of FIG. 3 taken along the lines 4—4 thereof;

FIG. 5 is an enlarged, side elevational, cross sectional view of the erosion control blanket of FIG. 1 taken along lines 5—5 and illustrating the underlying ground portion and the growth of vegetation therethrough in accordance with the principles of the present invention;

FIG. 6 is an enlarged, perspective view of a finished erosion control blanket rolled and packaged for shipment;

FIG. 7 is a fragmentary top plan view of two erosion control blanket mats being assembled one against the other for illustrating the interlocking configuration along the sides thereof;

FIGS. 8A, 8B and 8C are top plan, fragmentary views of three embodiments of individual erosion control blanket mats illustrating various interlocking side wall configurations thereof which may be used in accordance with the principles of the present invention as shown in FIG. 7; and FIG. 9 is a diagrammatic, perspective view of an erosion control blanket manufacturing process in accordance with one embodiment of the principles of the present invention.

DETAILED DESCRIPTION

Figures 1, 2:
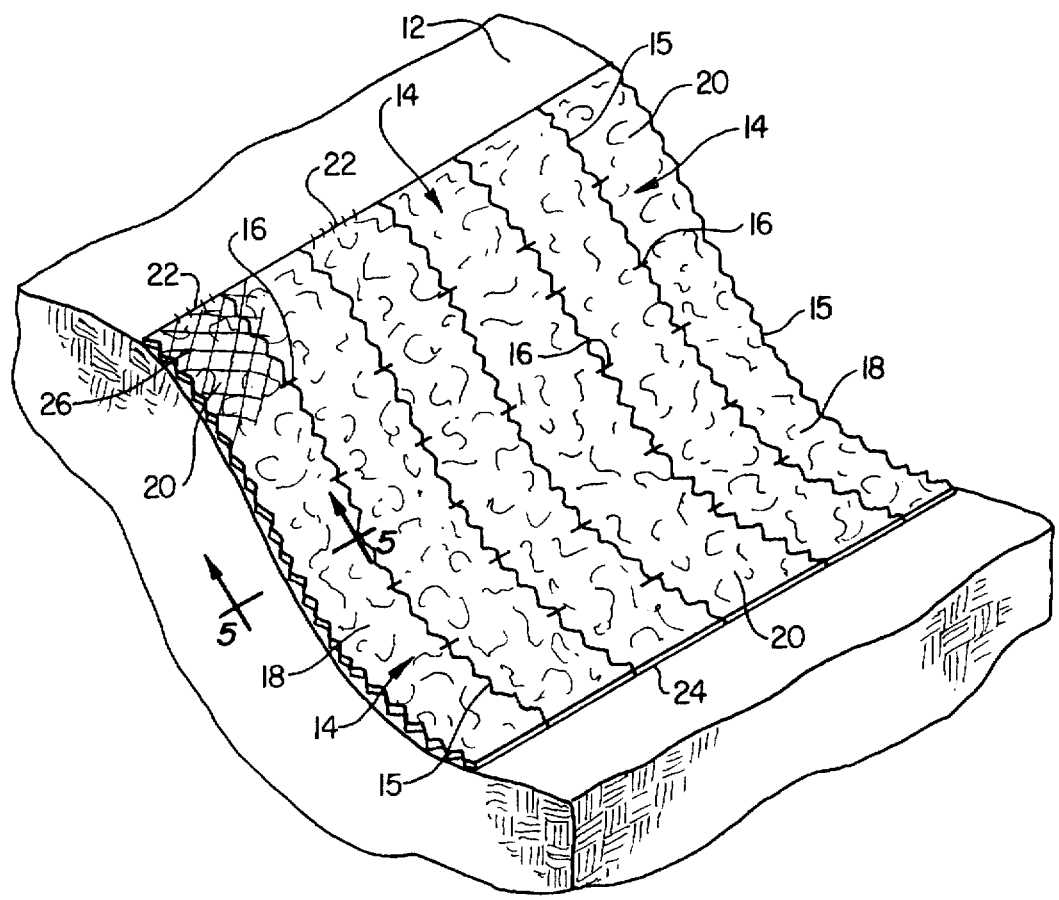
FIG. 1 is a fragmentary, perspective view of a sloping ground area covered by a series of vegetation growth-enhancing erosion control blankets embodying certain ones of the principles of the present invention.
FIG. 2 is an enlarged, fragmentary, perspective view of a portion of a prior art erosion control blanket.

Referring first to FIG. 1 there is shown in simplified form a section of ground having a downwardly sloping earth portion 12 normally subject to undesirable wind and water erosion forces, and upon which erosion-inhibiting ground vegetation is to be grown. Covering the sloping earth portion 12 are a series of specially designed, vegetation growth-enhancing, erosion control blankets 14 embodying principles of the present invention. Blankets 14, as later described, have a porous construction through which the planned-for ground vegetation may readily germinate and grow.

Referring still to FIG. 1, the blankets 14 have elongated, generally rectangular configurations with contoured side portions 15, specially configured for interlocking one with the other, and which are conventionally secured to one another and to the underlying sloping earth portion 12 by a spaced series of ground staples 16. Installed in this manner, the interlocked blankets 14 shield the sloping earth portion 12 from both wind and rain until the ground vegetation takes hold.

Referring still to FIG. 1, each of the erosion control blankets 14 includes an elongated rectangular mat 18 formed from fibrous material—i.e., a multiplicity of elongated fibers 20 disposed in a randomly intertwined relationship. Wood fibers 20 of the excelsior or wood wool variety are preferably used and collectively define therebetween a multiplicity of relatively small interstitial regions through which ground vegetation, such as grass 22, may upwardly grow from the sloping earth portion 12 protectively covered by blankets 14. Each mat 18, in this particular embodiment, has a substantially flat bottom surface 24 positionable directly against the sloping earth portion 12, side portions with contour 15, and a contoured top surface 26, a portion of which is being diagrammatically illustrated, as will be described in more detail below.

Referring now to FIG. 2, an enlarged, perspective view of a portion of a prior art erosion control blanket 114 is shown. Prior art blankets 114 are formed with straight sides 115 and at least one layer of a photodegradable netting 128 extending across a top side 126 to form a mat 118. A second plastic net 130 may be attached to the bottom side of the blanket to extend generally parallel to the top net member 128. Netting 128 and 130 serve to flexibly reinforce conventional mats 118 and facilitate their handling during installation of the erosion control blankets 114.

From a structural standpoint, the prior art erosion control blankets 114 are effective for erosion control. One embodiment of the blanket 114 shown in FIG. 2 has been manufactured and sold by the American Excelsior Company, Arlington, Tex. under the trade name "Curlex." However, in accordance with an important aspect of the present invention, the nettings 128 and 130, which may create ecological problems, have been removed and replaced with a bonding system as described below. In addition, the top surface of the new erosion control blanket 14 of FIG. 1 has an embossed surface which is specially engineered to improve the drag on water flowing thereover and over the contoured side portions 15 providing the interlocking relationship.

Referring now to FIG. 3 there is shown an enlarged, top plan view of the erosion control blanket 14 of FIG. 1 illustrating one aspect of the fabrication thereof in accordance with the principles of the present invention. The top surface 26 of erosion control blanket 14 is embossed with one of a variety of patterns 30 which increases the erosion control potential of the blanket 14 as well as the structural strength thereof. The improvement in structural strength by the embossed pattern 30 and the bonding system for the mat fibers 20 is necessary in view of the elimination of the plastic net described above.

Referring still to FIG. 3, the surface pattern 30 of this particular embodiment of the invention comprises a generally diamond shaped, or herring bone, pattern of indentations 32. The indentations 32 run in a first direction with a second set of indentations 34 running in an opposite, angled direction relative thereto. It should be noted that a wide variety of surface indentations, patterns and shapes may be utilized to comprise the pattern 30 of surface 26. The fibers 20 have themselves been bent and distorted during the manufacturing process, as described below. The fibers 20 of this particular embodiment are thus packaged in an intertwined manner and held together with a bonding agent, as described below, to form the pattern 30.

Referring now to FIG. 4 there is shown a side elevational, cross sectional view of the blanket 14 of FIG. 3 illustrating one particular pattern 30 thereupon. Consistent therewith, the indentations 32 are shown adjacent indentations 34 which indentations are staggered across the cross section thereof taken along lines 4—4. A variety of indentations can be utilized to form the pattern 30 of surface 26, although an intersecting pattern is shown herein for purposes of illustration. With the pattern 30, the utilization of a bonding agent of the type described below will be effective in providing a blanket 14 having sufficient integrity for use upon the sloping earth portion 12 in need of erosion control as shown in FIG. 1 and having a sufficient stiffness for permitting side contours 15 for interlocking one with the other. A bonding agent 50 is representedly shown in FIG. 4 as applied to an individual fiber 21. As will be discussed below, a sufficient quantity of fibers 20 are coated with the appropriate bonding agent to provide securement of an individual fiber 21 one to another in a configuration of pattern 30 affording the advantages described herein.

In further illustration of the particular blanket 14 shown in FIG. 4, the bottom surface 24 is substantially flat. The substantially flat bottom surface 24 engages the surface of the sloping earth portion 12 as shown in FIG. 1 to permit the infiltration of soil thereagainst and the stabilization of the blanket 14 thereupon. In this configuration, the surface pattern 30 is then positioned to slow the flow of water, so silt will be deposited over the area which is to be revegetated. The blanket 14 of the present invention will also reduce the velocity of water flowing thereover in channels or waterways.

Referring now to FIG. 5 there is shown an enlarged side elevational, cross sectional view of the erosion control blanket 14 of FIG. 1 taken along lines 5—5 thereof. In this particular view the earth portion 12 in need of erosion control is illustrated with grass 22 upstanding therethrough. The grass is penetrating the interstitial regions between fibers 20 to upstand from the top surface 26 thereof. The bottom surface 24, as described above, is substantially flat and abuttingly engages the surface of the earth portion 12 in conformance therewith. In certain applications, the flush engagement of the bottom surface 24 with the surface of the sloping earth portion 12 helps reduce the erosion thereof. Large spaces between the bottom surface 24 and the earth portion 12 could be detrimental and permit additional erosion to occur. However, with the fibers 20 in close proximity to the earth portion 12, either in an embossed pattern or flat thereagainst, the erosion thereof is substantially inhibited.

Referring still to FIG. 5, the surface indentations 34 and 32 are more clearly illustrated in the top surface 26. The indentations 32 and 34 comprise a surface pattern 30 as described above which surface pattern is, in this particular view, shown holding soil 52 in the various ones of the indentations 32 and 34 of the pattern 30. This soil accumulation is thought to occur in at least some of the indentations 32 and 34. It is the ability of the pattern 30 to hold soil therein that is a distinct advantage over the prior art as shown in FIG. 2, as well as the elimination of the netting thereof. Again the bonding agent 50 is diagrammatically shown upon an individual excelsior/wood wool fiber 21 for purposes of illustration only.

Referring now to FIG. 6 there is shown an erosion control blanket 14 in preparation for shipment. The blanket 14 has been rolled into a generally cylindrical configuration 60 and placed in a plastic bag 62 for shipment. In this configuration, the bag 62 may be shipped to a particular location for utilization of the erosion control blanket 14 and removed from the bag for placement upon the earth portion 12 to be controlled as shown in FIG. 1. Surface pattern 30 is representatively shown on the blanket 14, as is a contoured side wall 15.

Referring now to FIG. 7, there is shown a top plan, fragmentary view of first and second erosion control blanket mats 101 and 102 aligned for side-by-side, interlocking engagement one with the other. Mat 101 is shown to have a saw-tooth side portion 104 adapted for engaging a mating saw-tooth side portion 106 of mat 102. Arrows 111 indicate the aligned joinder of erosion control mats 101 and 102, one with the other, for an interlocking engagement therewith as described above. A variety of side wall configurations may of course be provided in accordance with the principles of the present invention as described below.

Referring now to FIGS. 8A, 8B and 8C, three different embodiments of the side wall configuration of the erosion control blanket mats constructed in accordance with the present invention are shown. Erosion control mat 110 of FIG. 8A has side portions 112 that include generally rectangular teeth 113. The rectangular teeth 113 are adapted for matingly engaging slots 116 formed therebetween in mating mats disposed adjacent thereto. In FIG. 8B mat 101 is again shown with sawtooth side portions 104 as described in FIG. 7.

FIG. 8C shows a mat 120 with opposite sinusoidal side edges 122 having a series of peaks 125 and valleys 127 formed therealong for interlocking engagement one with the other. The valleys 127 matingly engage the peaks 125 of mats adjacent to mat 120.

Referring now to FIG. 9, there is shown a method of manufacturing the control blanket of the erosion present invention. The manufacturing system 200 is shown herein fabricating the sinusoidal edge 122 of mat 120 shown in FIG. 8C for purposes of illustration.

Referring still to FIG. 9, the manufacturing process occurs by accumulating fibrous material 204, preferably of the excelsior/wood wool variety, placing it within a hopper 206 where it forms an elongated mat which is discharged from the hopper end 208. The discharged mat 210 is received upon a conveyor belt 209 carried by roll 212 to the packaging area. Roll 214 is also positioned adjacent the end 208 of the hopper 206 to engage the mat 210 which is then conveyed upon belt 209 in the direction of arrows 216 to an area beneath spray head assembly 218. The assembly 218 deposits a bonding agent 220 onto mat 210. A bonding agent supply line 222 is representatively shown, although the manner of supplying bonding agent to the spray head assembly 218 will be conventional in the art. Likewise, a plurality of spray heads 224 are shown forming the lower region of spray head assembly 218 for disseminating the bonding agent 220 to the elongate mat 210. Once the bonding agent, such as latex, has been sprayed upon the fibers of the mat, the mat surface 226 assumes a different consistency due to the adhesive which causes the fibers of the excelsior/wood wool 204 to hold together. The mat 210 is then conveyed upon belt 209 in the direction of arrow 228 to a position beneath a compression plate 230. Compression plate 230 is constructed to reciprocate in the direction of arrows 232 (upwardly and downwardly) for impressing upon the mat surface 226, disposed therebeneath, an embossed surface pattern. Surface 234 of plate 230 is thus formed with the appropriate pattern configuration for imparting the select surface pattern thereto. A crisscrossing surface pattern 236 is shown adjacent the end 238 of plate 230 diagrammatically indicating the presence of a surface pattern thereon. A variety of surface patterns are, of course, contemplated to solve various erosion problems.

After the impression of the surface pattern 236 to the surface 226 of the elongate mat 210, a drying period for the particular bonding agent may be necessary. For purposes of simplicity, no appreciable distance for drying of mat 210 is shown between end 238 of compression plate 230 and cutting assembly 240 described below. It should be noted, however, that an appropriate distance for interim drying and/or curing of the bonding agent for maintaining the permanence of the pattern may be necessary. In addition, some conventional equipment such as a forced air blower, heater, or the like, may likewise be necessary and would be available in accordance with conventional manufacturing technology. In a preferred embodiment, the plate 230 is heated and when sufficient time has passed, it raises. This allows the mat to proceed on to the edge cutting area and the rolling and Still referring to FIG. 9, a side cutting assembly 240 is shown disposed in a position for cutting the sinusoidal edges 122 of the mat 210 as described in FIG. 8C above. The cutting elements 242 are thus constructed with the appropriate shape for imparting the requisite side contour to the mat 210. A simplified diagrammatic cutting assembly 240 is thus shown comprising a pair of cutting elements 242 (representatively shown) and a single shaft 244 disposed therebetween. This is a diagrammatical representation, and it is obvious that other stamping, cutting, slicing, sawing and die forming assemblies may be used. Conventional cutting technology is available to form the appropriate side wall configuration. Likewise, variations in the manufacturing technique may be implemented depending on the particular configuration and/or adhesive which is used. The present embodiment teaches the utilization of a bonding agent such as latex sprayed upon the fibers of excelsior, wood wool or the like, which has previously been formed into a compressed mat structure, which is then embossed with a surface configuration and formed into the requisite mat necessary for effective erosion control as set forth herein.

Still referring to FIG. 9, the present invention includes the fabrication of erosion control blankets of varying sizes. The size depends on the application. The type of bonding system also depends on various factors. Adhesives may be applied to the fibrous material of the blanket during manufacture by spraying or by other coating techniques as appropriate with the particular adhesives to be used. For purposes of example only, a latex adhesive has been described herein, but the present invention is not limited to the use of only latex. The dryness and natural absorbency of excelsior/wood wool mat material would of course cause the mat length exiting the spraying housing to dry quite rapidly. Bonding systems could be used which fuse the fibers 20 together with heat, glue or mechanical means. The use of such bonding systems eliminates the need for netting around the fibers 20 or for adhesive coating thereon.

While the present invention has been representatively illustrated and described in conjunction with an erosion control blanket formed from excelsior/wood wool, it will be readily appreciated by those skilled in this art that principles of the invention could also be used to advantage with porous erosion control blankets formed from other fibrous types of materials.

It is thus believed that the operation and construction of the present invention will be apparent from the foregoing description. While the method and apparatus shown or described has been characterized as being preferred, it will be obvious that various changes and modifications may be made therein without departing from the spirit and scope of the invention as defined in the following claims.

What is claimed is:

1. A vegetation growth-enhancing erosion control blanket that may be placed on an area upon which ground vegetation is to be grown, said blanket comprising:

a flexible mat of intertwined, elongated members, said members being of a material and collectively defining in said mat a multiplicity of interstitial regions through which portions of the growing ground vegetation may pass generally transversely to said mat, said flexible mat further defining a contoured side portion along at least one edge of said mat for providing an interlocking engagement with a complimentary contoured side portion of an adjacent mat;

at least a major portion of said members being held in place with a bonding agent in a manner providing said mat with structural integrity;

an embossed surface comprising the top of said mat, said embossed surface comprising a pattern for enhancing the structural integrity thereof and the erosion control aspects therewith.

2. The blanket of claim 1 wherein said mat is an excelsior mat.

3. The blanket of claim 1 wherein said embossed surface of said mat comprises a three dimensional pattern impressed therein.

4. The blanket as set forth in claim 3 wherein said pattern comprises a generally herringbone pattern impressed into said surface of said mat.

5. A vegetation growth-enhancing erosion control blanket that may be placed on an area upon which ground vegetation is to be grown, said blanket comprising:

mat, the individual fibers thereof collectively defining in said mat a multiplicity of interstitial regions through which portions of the growing ground vegetation may pass, said flexible mat further defining a contoured side portion along at least one edge of said mat for providing an interlocking engagement with a complimentary contoured side portion of an adjacent mat;

at least a major portion of the individual fibers being held together with an adhesive bonding agent; and an embossed surface comprising the top of said mat, said embossed surface comprising a pattern for enhancing structural integrity thereof and erosion control aspects therewith.

6. The blanket of claim 5 wherein said bonding agent is latex.

7. The blanket of claim 5 wherein said pattern of said embossed surface is a herringbone pattern.

* * * * *